Figure 1:
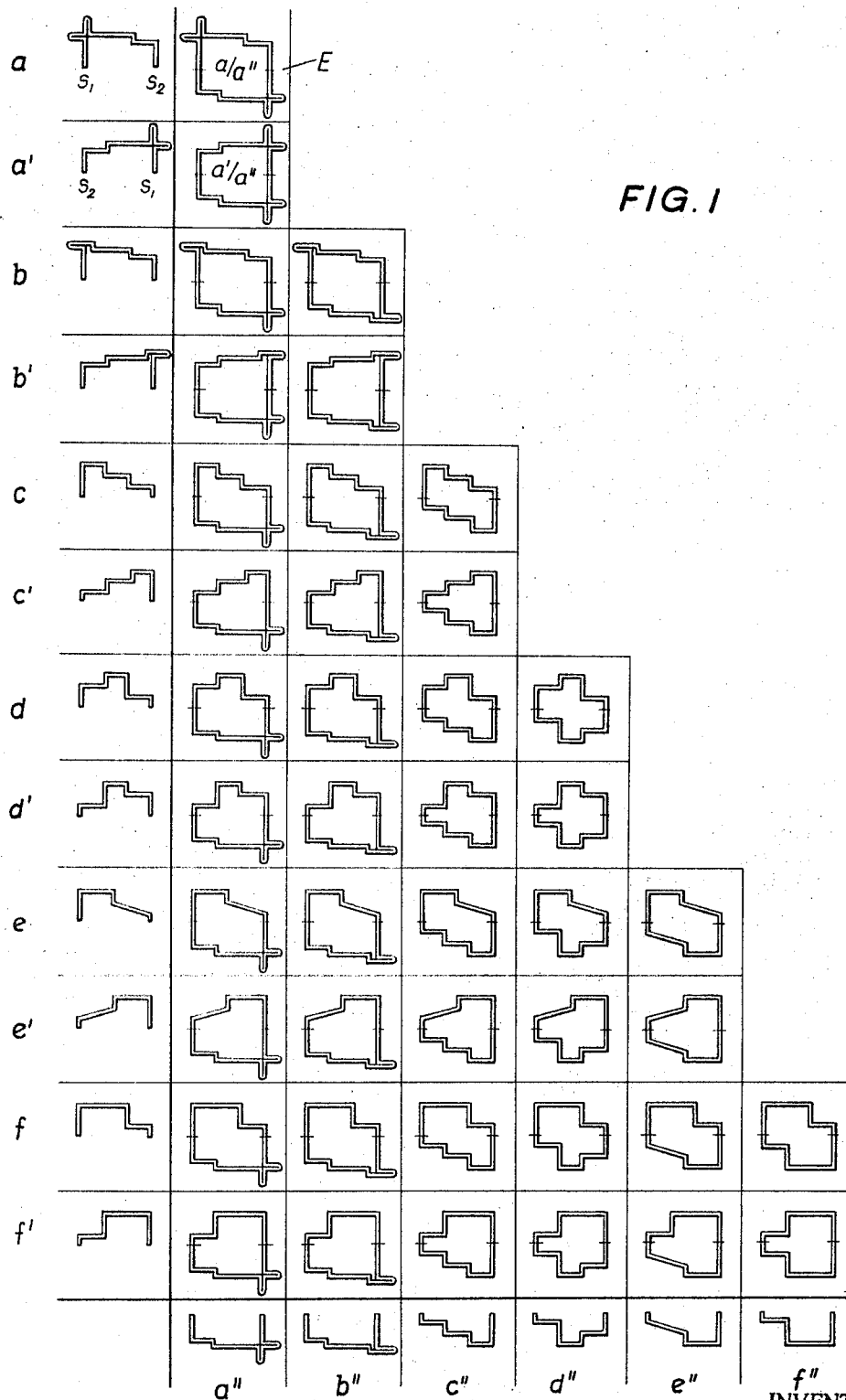

United States Patent
Wögerbauer et al.

[15] 3,656,515
[45] Apr. 18, 1972

[54] SHAPED TUBE

[72] Inventors: Alfred Wögerbauer; Rudolf Strasser, both of Linz, Austria

[73] Assignee: Vereinigte Osterreichische Eisen-und Stahlwerke Aktiengesellschaft, Linz, Austria

[22] Filed: June 2, 1970

[21] Appl. No.: 42,735

[30] Foreign Application Priority Data

June 6, 1969 Austria ............................A 5360/69

[52] U.S. Cl.......................................138/171, 138/DIG. 11
[51] Int. Cl..........................................................F16l 9/22
[58] Field of Search....................138/171, DIG. 11, 177, 178

[56] References Cited

FOREIGN PATENTS OR APPLICATIONS 396,810   1/1966   Switzerland............................138/171

Primary Examiner—Houston S. Bell, Jr.
Attorney—Brumbaugh, Graves, Donohue & Raymond

[57] ABSTRACT

The improvement is in the field of shaped tubes made of component sections joined by butt-welding. A wide variety of shapes including non-symmetrical forms, is rendered feasible according to the invention which provides a shaped tube comprising two component sections having equidistant legs and joined along their facing leg ends by butt-weld seams applied in a common plane on opposite sides of said tube, wherein at least one of the four legs welded together in pairs is differing in length from at least one of the other legs.

6 Claims, 3 Drawing Figures

SHAPED TUBE

The invention relates to a shaped tube comprising two component sections joined by butt-welding and having equidistant legs, the welding seams connecting the leg ends lying opposite to each other in one plane.

Shaped tubes of this kind with regular cross sections e.g. square or rectangular tubes, are already known. Also, fold flange tubes are known, in which one wall or two opposite walls are formed with a fold flange. The component sections, from which these tubes were made, were, however, always formed with equidistant legs of equal length, i.e. the welding seam plane was, at the same time, a plane of symmetry of the shaped tube.

In overground work, particularly in portal constructions, there is an increasing need for a greater wealth of forms for sections. This demand cannot, at present, be fulfilled with economically produced tubes, i.e. butt-welded tubes. It has therefore been attempted to find new shapes for tubes that may economically be produced, i.e. by continuous butt-welding of component sections having equidistant legs.

According to the invention this task is solved in a shaped tube of the kind defined in the introduction, in that at least one of the four legs welded together in pairs is of different length as compared to at least one of the other legs. When this teaching is followed, numerous highly valuable variations of shaped tubes can be formed.

Advantageously each of the two component sections is provided with a longer and a shorter leg.

Another possibility for providing a great variation of shaped tubes can be realized by forming one of the two component sections, as compared to the other component section, with shorter legs, the legs of each component section, however, being of equal length.

Finally it is also possible that one component section has legs of different length, while the other component section has legs of equal length.

According to a preferred embodiment one component section is made of different material than the other; in particular one may be made of stainless steel and the other of low-alloyed steel or carbon steel.

Figure 2:
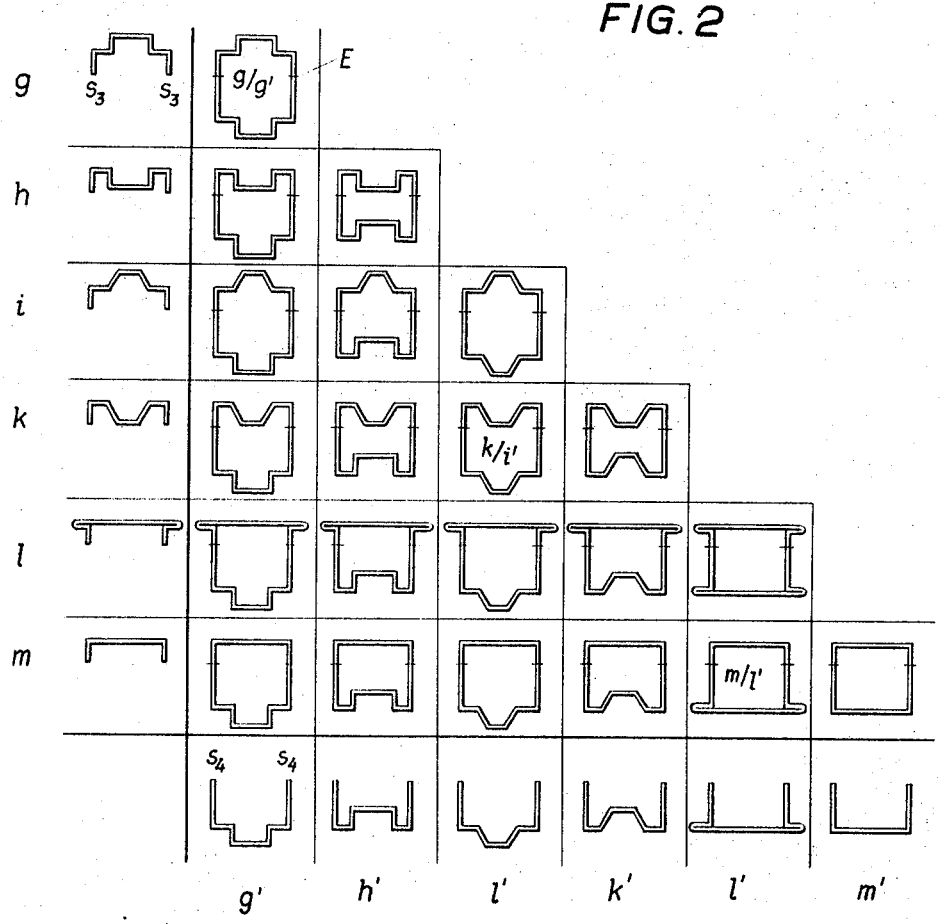
Figure 3:
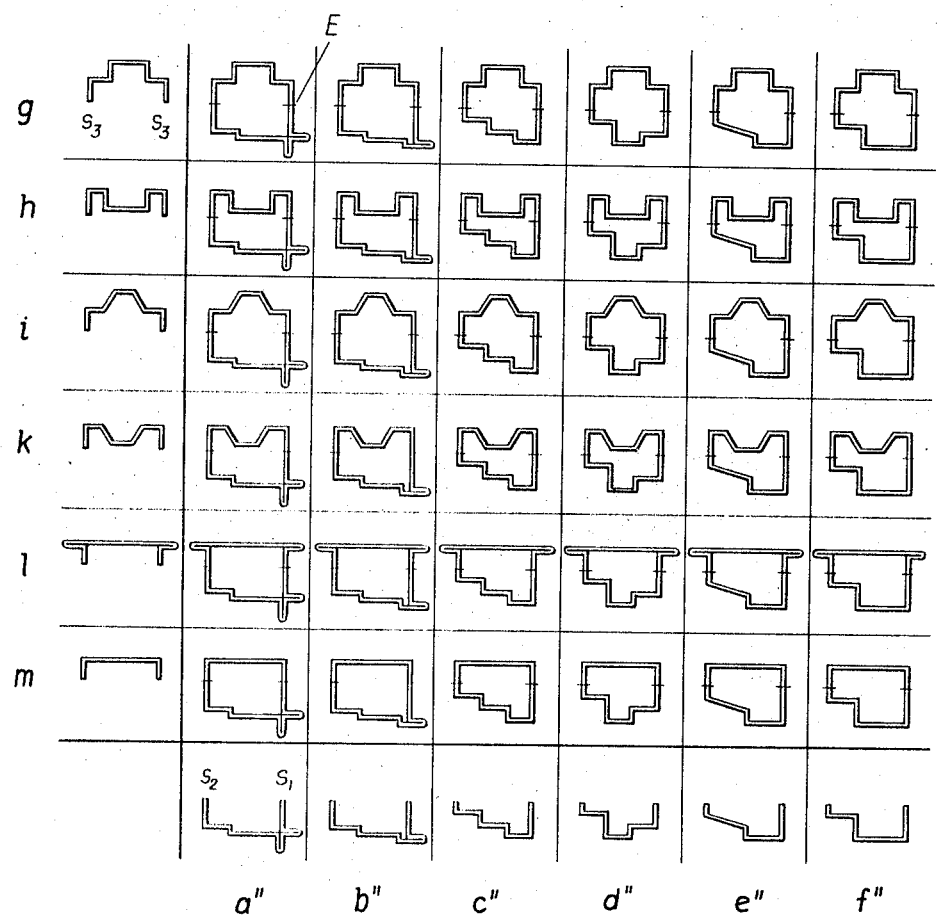

In order that the invention may be more fully understood it shall now be explained by reference to the accompanying drawings, in which FIG. 1 is a screen showing six component sections each having a longer and a shorter leg to be combined to 42 shaped tubes, FIG. 2 is a screen showing six component sections each having legs of equal length to be combined to 21 shaped tubes, and FIG. 3 is a screen showing 12 component sections to be combined to 36 shaped tubes.

In the Figures, in the first vertical row one component section, namely the upper section, is shown and in the last horizontal line the second component section, namely the lower section is shown. Together, the lower section and the upper section form the respective shapes of the tubes shown in the individual lines of the Figures.

In FIG. 1 the six component sections which are used for the variations of the shaped tubes are denoted with $a, b, c, d, e, f$. The sections $a$ and $a'$, $b$ and $b'$, $c$ and $c'$, $d$ and $d'$, $e$ and $e'$, $f$ and $f'$, respectively, in the vertical row are the reflected images of each other. The sections $a'', b'', c'', d'', e''$ and $f''$ in the last horizontal row are the sections $a, b, c, d, e$ and $f$ turned by 180°. Each of the sections has two equidistant legs $s_1$ and $S_2$ which are of different length; $s_1$ is longer than $s_2$. By joining a section $a$ with a section $a''$ an unsymmetrical section $a/a''$ is obtained; by joining the section $a'$ with the section $a''$ the symmetrical section $a'/a''$ is obtained. All other section shapes of FIG. 1 are formed in a similar manner, the welding seam plane being denoted with E. The difference of the leg length may vary. While in the sections $a, a', a''$ and $b, b', b''$ the difference amounts to about the double sheet thickness, it is considerably greater in the sections $c, c', c'', d, d', d'', e, e', e'', f, f', f'$.

In FIG. 2, in the vertical row, symmetrical component sections $g, h, i, k, l, m$ are shown, the legs $s_3$ of which are of equal length. In the last horizontal row symmetrical sections $g', h', i', k', l'$ and $m'$ are shown; their forms correspond to those of the sections $g$ to $m$ but they are turned by 180° and they are provided with longer legs $s_4$. By joining one of the component sections of the vertical row with a component section of the horizontal row the forms of sections shown in the individual lines are obtained, e.g. $g/g'$ or $k/i'$ which are, similarly as the sections of FIG. 1, joined in the weld seam plane E by butt-welding. All sections of FIG. 2 are symmetrical in a plane lying perpendicularly to the weld seam plane.

FIG. 3 illustrates a further variation, in which the six symmetrical sections $g, h, i, k, l$ and $m$, which were discussed in connection with FIG. 2 and have legs $s_3$ of equal length are used as upper sections and the sections $a'', b'', c'', d'', e''$ and $f''$ which were discussed in connection with FIG. 1 and have legs $s_1$ and $s_2$ of different length serve to form the lower sections. Upper section and lower section are joined in the weld seam plane E by butt-welding.

As may be derived from FIG. 2, 21 different shapes are obtained by the combination of the sections $g, h, i, k, l$ and $m$ with the sections $g', h', i', k', l'$ and $m$. Yet, an additional variation regarding the position of the weld seam plane is possible; for instance the section shape $m/l'$ may also be obtained by combining the component sections $l$ and $m'$, in which case the weld seam lies somewhat nearer to the plane of the fold flanges than is the case with a combination of the sections $m$ and $l'$. In this way, also in FIG. 2 36 variations are possible. This may be of particular importance when the two component sections are to be manufactured of different materials, e.g. one section of stainless steel and the other section of low-alloyed or carbon steel, and when a great difference of the length of the legs is desired.

The wealth of possible combinations achieved by the formation of the shaped tubes according to the invention permits a wide technological applicability. Yet the shaped tubes can be easily manufactured with a minimum of tools. For the formation of the component sections described in FIGS. 1 to 3 2 × 12 tool sets, i.e. shaped rolls, are needed which are necessary for the production of component sections, and with them 114 kinds of shaped tubes may be produced.

What we claim is:

1. A shaped tube formed of two component sections butt-welded together, each of said sections having two parallel legs spaced the same distance apart, the two component sections of the tube being any two sections selected from a plurality of component sections which plurality includes a first group of sections in which the two legs of each section are of unequal length and a second group of sections in which the two legs of each section are of equal length, the two component sections being assembled with their respective pairs of parallel legs abutting each other and being butt-welded therealong with the butt-weld seams positioned on opposite sides of the tube and lying in the same plane, and at least one of the four legs of the two component sections being different in length from at least one of the other legs, whereby the pair of component sections forming a given tube may be selected both from one of said groups of sections or one from each of said groups of sections.

2. The shaped tube set forth in claim 1, wherein each of the two component sections has a longer and a shorter leg.

3. The shaped tube set forth in claim 1, wherein one component section has shorter legs than the other component section, the two legs of each individual component section being of equal length.

4. The shaped tube set forth in claim 1, wherein one component section has legs of different length while the other component section has legs of equal length.

5. The shaped tube set forth in claim 1, wherein one component section is made of a different material than the other.

6. The shaped tube set forth in claim 1, wherein one component section is made of stainless steel, the material for the other component section being selected from low-alloy and carbon steels.

* * * * *